(12) United States Patent
He et al.

(10) Patent No.: US 9,311,468 B2
(45) Date of Patent: Apr. 12, 2016

(54) ELECTRONIC DEVICE AND METHOD FOR CONTROLLING ACCESS TO THE ELECTRONIC DEVICE

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Xi-Huai He, Wuhan (CN); Chun-Sheng Chen, New Taipei (TW)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 15 days.

(21) Appl. No.: 14/497,938

(22) Filed: Sep. 26, 2014

(65) Prior Publication Data

US 2015/0154409 A1    Jun. 4, 2015

(30) Foreign Application Priority Data

Nov. 30, 2013    (CN) .......................... 2013 1 0632573

(51) Int. Cl.
*G06F 12/14*    (2006.01)
*G06F 21/32*    (2013.01)

(52) U.S. Cl.
CPC ...................................... *G06F 21/32* (2013.01)

(58) Field of Classification Search
CPC ....................................................... G06F 21/32
USPC ............................................................ 726/17
See application file for complete search history.

(56) References Cited

U.S. PATENT DOCUMENTS

| 8,675,828 B2* | 3/2014 | Kim ....................... H04M 3/385 379/88.02 |
| 8,676,579 B2* | 3/2014 | Hymel ................... G10L 17/005 704/235 |
| 2011/0275348 A1* | 11/2011 | Clark ....................... G06F 21/32 455/411 |
| 2012/0245941 A1* | 9/2012 | Cheyer .................... G10L 17/24 704/246 |

* cited by examiner

*Primary Examiner* — Peter Shaw
(74) *Attorney, Agent, or Firm* — Novak Druce Connolly Bove + Quigg LLP

(57) ABSTRACT

Method of unlocking an electronic device includes outputting a first portion of a predetermined video file, on a display device of the electronic device when the electronic device is locked. A second portion of the predetermined video file is outputting when a first time length of a detected microphone signal is greater than a first predetermined duration. The electronic device is unlocked when a second time length of the detected microphone signal is greater than a second predetermined duration, while the second portion of the predetermined video file is outputting.

9 Claims, 2 Drawing Sheets

ELECTRONIC DEVICE AND METHOD FOR CONTROLLING ACCESS TO THE ELECTRONIC DEVICE

CROSS-REFERENCE TO RELATED APPLICATIONS

This application claims priority to Chinese Patent Application No. 201310632573.1 filed on Nov. 30, 2013, the contents of which are incorporated by reference herein.

FIELD

Embodiments of the present disclosure relate to access control technology, and particularly to an electronic device and method for controlling access to the electronic device.

BACKGROUND

An electronic device (e.g., a mobile phone) may be locked using a password. When the electronic device is locked, a user may use a password that is not easy to break, to keep the electronic device safe and avoid theft of information.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
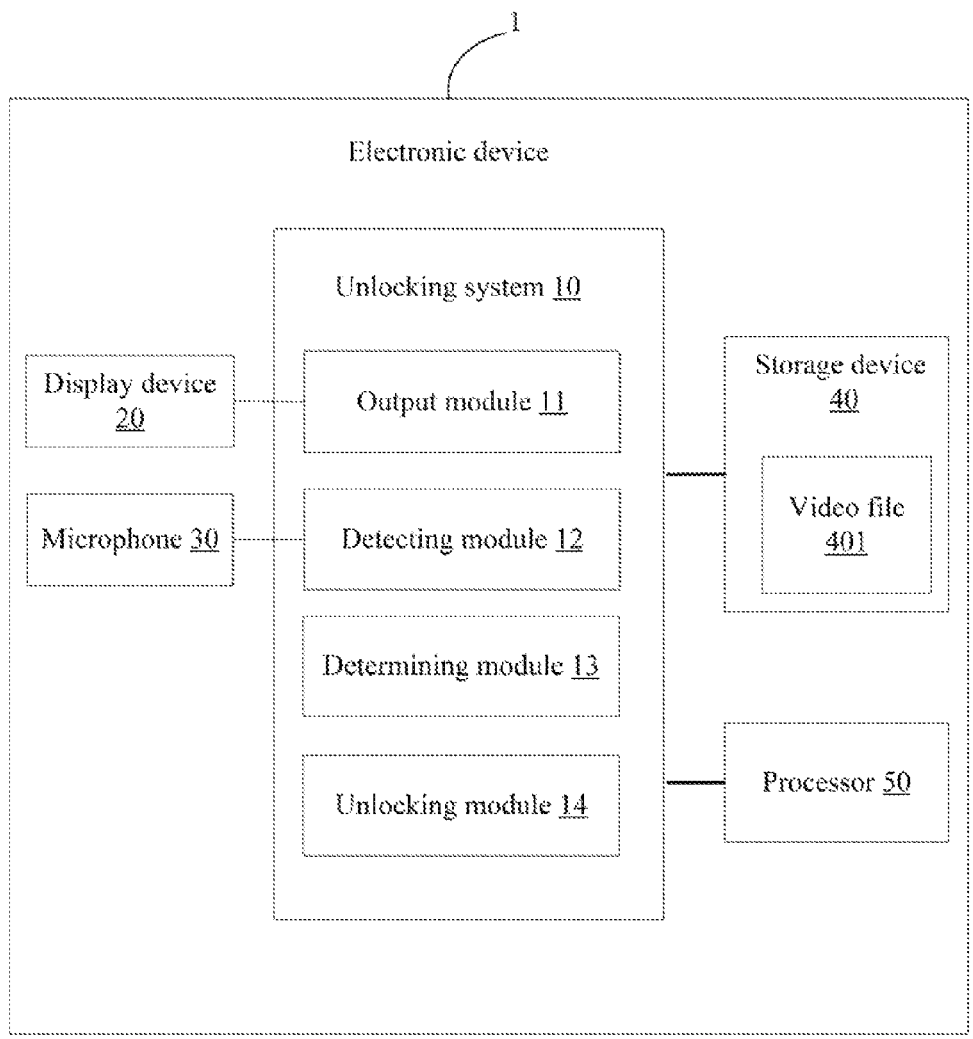
FIG. 1 is a diagrammatic view of one embodiment of an electronic device including a unlocking system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The present disclosure, including the accompanying drawings, is illustrated by way of examples and not by way of limitation. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.

FIG. 1 illustrates a diagrammatic view of one embodiment of an electronic device. Depending on the embodiment, the electronic device 1 includes an unlocking system 10, a display device 20, a microphone 30, a storage device 40, and at least one processor 50. The electronic device 1 may be a smart phone, a personal digital assistant (PDA), a tablet computer, or any other suitable electronic device. FIG. 1 illustrates only one example of the electronic device 1 that may include more or fewer components than illustrated, or have a different configuration of the various components in other embodiments.

The display device 20 displays information, such as images or videos of the electronic device 1. The microphone 30 receives audio data, and converts the audio data into microphone signals, which can be recognized by a software (e.g., the unlocking system 10) of the electronic device 1.

The storage device 40 may be a non-volatile computer storage chip that can be electrically erased and reprogrammed, such as a flash memory card. In this embodiment, the unlocking system 10 pre-stores a video file 401 in the storage device 40.

The unlocking system 10 can unlock the electronic device 1 when a special microphone signal is received. Details will be given in the following. In at least one embodiment, the unlocking system 10 may include an output module 11, a detecting module 12, a determining module 13, and an unlocking module 14. The function modules 11, 12, 13, and 14 may include computerized codes in the form of one or more programs, which are stored in the storage device 40, and are executed by the at least one processor 50 to provide functions of the present disclosure. Details will be given in the following paragraphs.

In at least one embodiment, when the electronic device 1 is locked, the output module 11 outputs a first portion of a predetermined video file (e.g., the video file 401) on the display device 20. For example, the video file 401 includes a plurality of frames, the output module 11 outputs the a number (e.g., 1-10) of frames of the video file 401 on the display device 20 when the electronic device 1 is locked.

The detecting module 12 detects a microphone signal from the microphone 30. For example, when a user breathes into the microphone 30, the microphone 30 receives a breathing sound, and converts the breathing sound into a microphone signal which can be recognized by the detecting module 12. That is, when the user breathes into the microphone 30, the microphone signal can be detected by the detecting module 12.

The determining module 13 determines whether a voltage value of the microphone signal is greater than a predetermined value (e.g., 55 millivolt (mv)).

The determining module 13 further determines whether a first time length of the detected microphone signal is greater than a first predetermined duration (e.g., 10 millisecond (ms)). In at least one embodiment, when the user wants to unlock the electronic device 1, the user can breath into the microphone 30 continuously to ensure that the first time length of the detected microphone signal is greater than the first predetermined duration.

The output module 11 outputs a second portion of the predetermined video file under the condition that the first time length is greater than the first predetermined duration. In one embodiment, the second portion of the predetermined video file is a continuation of the first portion. For example, the second portion is the 11-20 frames of the video file 401, when the first portion is the 1-10 frames.

The determining module 13 determines whether a second time length of the detected microphone signal is greater than a second predetermined duration, while the second portion of the predetermined video file is playing. In one embodiment, the second time length is calculated from the beginning of the second portion of the predetermined video file, and the second predetermined duration is equal to a time length of the second portion of the predetermined video file.

The unlocking module 14 unlocks the electronic device 1 under the condition that the second time length of the detected microphone signal is greater than the second predetermined duration, while the second portion of the predetermined video file is outputting.

Figure 2:
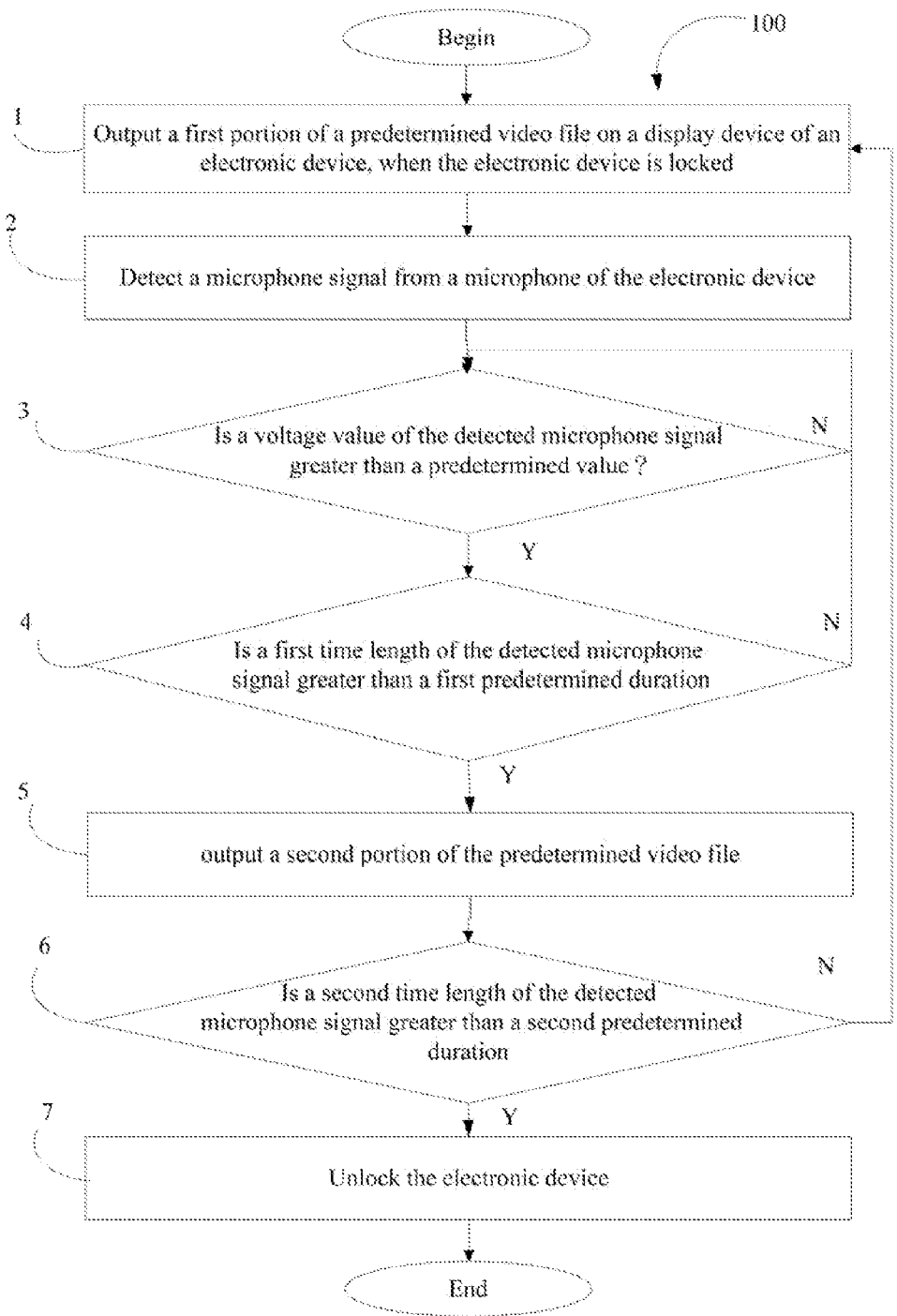
FIG. 2 illustrates a flowchart of one embodiment of a method for unlocking the electronic device of FIG. 1.

FIG. 2 illustrates a flowchart is presented in accordance with an example embodiment. The example method 100 is provided by way of example, as there are a variety of ways to carry out the method. The method 100 described below can be carried out using the configurations illustrated in FIG. 1, for example, and various elements of these figures are referenced in explaining example method 100. Each block shown in FIG. 2 represents one or more processes, methods or subroutines, carried out in the exemplary method 100. Additionally, the illustrated order of blocks is by example only and the order of the blocks can be changed according to the present disclosure. The exemplary method 100 can begin at block 1. Depending on the embodiment, additional steps can be added, others removed, and the ordering of the steps can be changed.

In block 1, a output module outputs a first portion of a predetermined video file on a display device of an electronic device, when the electronic device is locked. For example, the predetermined video file includes a plurality of frames, the output module outputs a number (e.g., 1-10) of frames of the predetermined video file on the display device when the electronic device is locked.

In block 2, a detecting module detects a microphone signal from a microphone of the electronic device. For example, when a user of the electronic device breathes into the microphone , the microphone receives the breathing sound, and converts the breathing sound into a microphone signal which can be recognized by the detecting module. That is when the user blows into the microphone, the microphone signal can be detected by the detecting module.

In block 3, a determining module determines whether a voltage value of the detected microphone signal is greater than a predetermined value (e.g., 55 millivolt (mv)). If the voltage value of the detected microphone signal is greater than the predetermined value, the process goes to block 4. Otherwise the process returns to block 3.

In block 4, the determining module further determines whether a first time length of the detected microphone signal, is greater than a first predetermined duration (e.g., 10 millisecond (ms)). If the first time length of the detected microphone signal is greater than the first predetermined duration, the process goes to block 5. Otherwise the process returns to block 3.

In one embodiment, when the user wants to unlock the electronic device, the user can blow into the microphone continuously to ensure that the first time length of the detected microphone signal is greater than the first predetermined duration.

In block 5, the output module outputs a second portion of the predetermined video file under the condition that the first time length is greater than the first predetermined duration. In one embodiment, the second portion of the predetermined video file is a continuation of the first portion. For example, the second portion is the 11-20 frames of the predetermined video file, when the first portion is the 1-10 frames.

In block 6, the determining module determines whether a second time length of the detected microphone signal, is greater than a second predetermined duration, while the second portion of the predetermined video file is playing. If the second time length of the detected microphone signal is greater than the second predetermined duration, the process goes to block 7, otherwise the process returns to block 1.

In one embodiment, the second time length is calculated from the beginning of the second portion of the predetermined video file, and the second predetermined duration is equal to a time length of the second portion of the predetermined video file.

In block 7, a unlocking module unlocks the electronic device under the condition that the second time length of the detected microphone signal, is greater than the second predetermined duration, while the second portion of the predetermined video file is outputting.

To increase the user experience of the electronic device, in one embodiment, the first portion (e.g., the 1-10 frames) of the predetermined video file shows a plurality of dandelion seeds which are floating on the display, and the second portion (e.g., the 11-20 frames) of the predetermined video file shows the dandelion seeds floating slowly away till disappearing from the display device.

As the electronic device is unlocked under the condition that the second time length of the detected microphone signal, is greater than the second predetermined duration, while the second portion of the predetermined video file is outputting, if the second time length is calculated from the beginning of the second portion of the predetermined video file, and the second predetermined duration is equal to the time length of the second portion of the predetermined video file, then the electronic device is unlocked when the dandelion seeds float away from the display device.

From the above blocks, we can see that the electronic device being unlocked is associated with the microphone signal. It is hard for an illegal user to gain access to the electronic device if the illegal user does not know the electronic device can be unlocked by blowing into the microphone of the electronic device. That secures the electronic device.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A computer-implemented method for controlling access to an electronic device being executed by a processor of the electronic device, the electronic device comprises a display device and a microphone, the method comprising:

outputting a first portion of a predetermined video file on the display device when the electronic device is locked;

detecting a microphone signal whose voltage value is greater than a predetermined value from the microphone;

outputting a second portion of the predetermined video file under the condition that a first time length of the detected microphone signal is greater than a first predetermined duration; and unlocking, while the second portion of the predetermined video file is outputting, the electronic device under the condition that a second time length of the detected microphone signal is greater than a second predetermined duration.

2. The method according to claim 1, wherein the second predetermined duration is equal to a time length of the second portion of the predetermined video file.

3. The method according to claim 1, wherein the second portion of the predetermined video file is a continuation of the first portion.

4. An electronic device, comprising:
a display device;
a microphone;
a processor; and
a storage device that stores one or more programs, when executed by the at least one processor, cause the at least one processor to:
output a first portion of a predetermined video file on the display device when the electronic device is locked;
detect a microphone signal whose voltage value is greater than a predetermined value from the microphone;
output a second portion of the predetermined video file under the condition that a first time length of the detected microphone signal is greater than a first predetermined duration; and
unlock, while the second portion of the predetermined video file is outputting, the electronic device under the condition that a second time length of the detected microphone signal is greater than a second predetermined duration.

5. The electronic device according to claim 4, wherein the second predetermined duration is equal to a time length of the second portion of the predetermined video file.

6. The electronic device according to claim 4, wherein the second portion of the predetermined video file is a continuation of the first portion.

7. A non-transitory storage medium having stored thereon instructions that, when executed by a processor of an electronic device, causes the processor to perform a method for unlocking the electronic device, the electronic device comprising a display device and a microphone, wherein the method comprises:
outputting a first portion of a predetermined video file on the display device when the electronic device is locked;
detecting a microphone signal whose voltage value is greater than a predetermined value from the microphone;
outputting a second portion of the predetermined video file under the condition that a first time length of the detected microphone signal is greater than a first predetermined duration; and
unlocking, while the second portion of the predetermined video file is outputting, the electronic device under the condition that a second time length of the detected microphone signal is greater than a second predetermined duration.

8. The non-transitory storage medium according to claim 7, wherein the second predetermined duration is equal to a time length of the second portion of the predetermined video file.

9. The non-transitory storage medium according to claim 7, wherein the second portion of the predetermined video file is a continuation of the first portion.

* * * * *